United States Patent
Gangasani et al.

(10) Patent No.: US 8,799,713 B2
(45) Date of Patent: Aug. 5, 2014

(54) INTERRUPTIBLE NON-DESTRUCTIVE RUN-TIME BUILT-IN SELF-TEST FOR FIELD TESTING

(75) Inventors: Swathi Gangasani, Bangalore (IN); Srinivasulu Alampally, Costa Mesa, CA (US); Prohor Chowdhury, Bangalore (IN); Srinivasa B S Chakravarthy, Bangalore (IN); Padmini Sampath, Bangalore (IN); Rubin Ajit Parekhji, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 236 days.

(21) Appl. No.: 13/407,474

(22) Filed: Feb. 28, 2012

(65) Prior Publication Data
US 2012/0226942 A1  Sep. 6, 2012

(30) Foreign Application Priority Data
Mar. 1, 2011  (IN) .............................. 602/CHE/2011

(51) Int. Cl.
G06F 11/00 (2006.01)
G06F 11/27 (2006.01)

(52) U.S. Cl.
CPC ..................................... G06F 11/27 (2013.01)
USPC ........................................... 714/30; 714/735

(58) Field of Classification Search
USPC ............................................ 714/30, 31, 735
See application file for complete search history.

(56) References Cited

U.S. PATENT DOCUMENTS

| | | | | |
|---|---|---|---|---|
| 5,689,466 | A * | 11/1997 | Qureshi | 365/201 |
| 5,937,154 | A * | 8/1999 | Tegethoff | 714/30 |
| 6,446,221 | B1 * | 9/2002 | Jaggar et al. | 714/30 |
| 6,539,497 | B2 * | 3/2003 | Swoboda et al. | 714/30 |
| 7,047,462 | B2 * | 5/2006 | Brown et al. | 714/724 |
| 7,152,186 | B2 * | 12/2006 | Airaud et al. | 714/30 |
| 7,332,929 | B1 * | 2/2008 | Normoyle et al. | 326/16 |
| 7,398,440 | B2 * | 7/2008 | Warren | 714/724 |
| 7,610,537 | B2 * | 10/2009 | Dickinson et al. | 714/733 |
| 7,657,807 | B1 * | 2/2010 | Watkins et al. | 714/727 |
| 2008/0229166 | A1 * | 9/2008 | Datta et al. | 714/735 |

* cited by examiner

Primary Examiner — Yolanda L Wilson
(74) Attorney, Agent, or Firm — John R. Pessetto; Frederick J. Telecky, Jr.

(57) ABSTRACT

A built-in self-test (BIST) diagnostic system tests the execution of a processor. The processor is arranged to execute a normal application for controlling a process that is external to the processor. The normal execution is executed in normal execution timeslots that have idle timeslots that are interspersed in time between the normal execution timeslots. A BIST controller is arranged to detect the presence of an idle timeslot in the execution of the processor and to use a scan chain to scan-in a first test pattern for a test application for testing the processor. The first test pattern is executed by the processor during the detected idle timeslot and a first result pattern generated by the execution of the first test pattern is scanned-out. The scanned-out first test pattern is evaluated to determine the presence of an error. The first test pattern application is conditionally interruptible.

2 Claims, 8 Drawing Sheets

INTERRUPTIBLE NON-DESTRUCTIVE RUN-TIME BUILT-IN SELF-TEST FOR FIELD TESTING

CLAIM OF PRIORITY

This application for Patent claims priority to India Provisional Application No. 602/CHE/2011 entitled "Interruptible Non-Destructive Run-Time Built-in Self-Test for Field Testing" filed Mar. 1, 2011, wherein the application listed above is incorporated by reference herein.

BACKGROUND

In mission-critical applications being executed by electronic devices, the proper operation of the devices is typically assessed continuously to ensure the safe and proper operation of the devices. Various conditions and events can cause failures in electrical devices that adversely effect the safe and proper operation. The consequences of such failures are of typically much greater concern when the electrical devices in which the failures occur are performing safety-related processes. The safety-related processes include applications that require on-going monitoring and verification of the processor performing safety-related processes. When the devices are being operated by users (as compared to the manufacturers, for example), self-test mechanisms are deployed in the field to ensure that the task of verifying safe and proper operation of the devices can be performed.

The embedded and real-time nature of these applications requires them to be functionally operational for extended periods. However, it is difficult to test the electronic devices executing the mission-critical applications during these extended periods without affecting the performance of the electronic device. Thus, many such devices rely upon power-up testing of the device to detect and/or diagnose faults. However, failures that occur during the extended operational periods might not be detected in a timely manner when relying upon power-up testing.

SUMMARY

The problems noted above are solved in large part by interleaving test operations during normal functional operations. The test operations are interleaved in the form of interruptible windows of operation, wherein the cumulative effect of interleaving the test operations over multiple windows is virtually the same as if the test operations were executed over one large uninterrupted window. In such situations, field test operations are often performed several times during the execution of normal application operations. At the end of each such field test operation window (whether interrupted or uninterrupted), the normal application resumes execution using the processor context of where the executing processor was halted for testing. Resumption of execution at the point where the executing processor was halted for purposes of testing, for example, results in a non-destructive test mechanism. In various embodiments, interrupts that occur during the execution of a field test are logged and asserted after the end of the field test.

A built-in self-test (BIST) diagnostic system tests the execution of a processor. The processor is arranged to execute a normal application for controlling a process that is external to the processor. The normal execution is executed in normal execution timeslots that have idle timeslots that are interspersed in time between the normal execution timeslots. A BIST controller is arranged to detect the presence of an idle timeslot in the execution of the processor and to use a scan chain to scan-in a first test pattern for a test application for testing the processor. The first test pattern is executed on the processor during the detected idle timeslot and a first result pattern generated by the execution of the first test pattern is scanned-out. The scanned-out first test pattern is evaluated to determine the presence of an error. The device under test is not necessarily restricted to a processor module executing software code. The device under test can be generically extended to any programmable digital module whose state can be captured and re-initialised at the window boundaries. The scan operation corresponding to the first pattern can be extended to a larger set of patterns wherein the set can contain multiple such patterns. The evaluation to determine the presence of an error in that case is performed when the application of the last pattern in the set is complete. The first test pattern application, in the presence of an interrupt, is continued to completion or is aborted based upon whether the first test initiated in the idle timeslot is interruptible.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections.

Figure 1:
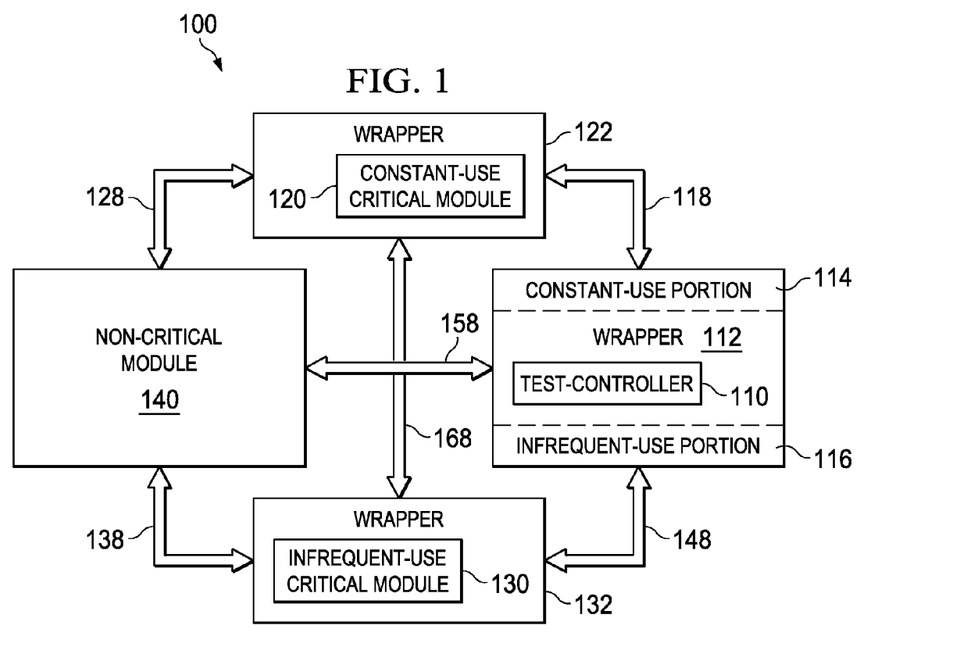
FIG. 1 shows an illustrative operating environment 100 for interruptible non-destructive run-time built-in self-test in accordance with embodiments of the disclosure.

FIG. 1 shows an illustrative operating environment 100 for interruptible non-destructive run-time built-in self-test in accordance with embodiments of the disclosure. For example, a test controller is arranged to test a constant-use critical module 120, and infrequent-use critical module 130, and a non-critical module 140. Each of the modules may be a system in its own right, or subsystems that are incorporated into electronic devices such as an automotive or avionics controller, a personal digital assistant (e.g., a BLACKBERRY® device), a personal computer, mobile phone, or any other type of electronic system.

Constant-use critical module is coupled to a wrapper 112 that typically includes software and hardware components for communicating with the wrappers for modules-under-test. For example, wrapper 112 is logic that includes a constant-use portion 114 that is arranged to communicate with the wrapper 122 of the constant-use critical module 120, and an infrequent-use portion 116 that is arranged to communicate with the wrapper 132 of the infrequent-use critical module 130. Wrapper 112 is also arranged to communicate with non-critical module 140.

The use of wrappers allows, for example, modularity, software re-use, and flexibility in accommodating a variety of modules-under-test. The wrappers are also arranged to permit communications between any other module whether the module has an associated module (or not). For example, test-controller 110 is arranged to communicate (bi-directionally) with constant-use critical module 120 via handshake logic 118, with non-critical module 140 via handshake logic 158, and with infrequent-use critical module 130 via handshake logic 148. Constant-use critical module 120 is arranged to communicate (bi-directionally) with non-critical module 140 via handshake logic 128 and with infrequent-use critical module 130 via handshake logic 168. Non-critical module 140 is arranged to communicate (bi-directionally) with infrequent-use critical module 130 via handshake logic 138.

Non-critical modules of the system (such as non-critical module 140) are usually tested once (e.g., before sale) for manufacturing defects. Critical modules that are infrequently used (such as infrequent-use critical module 130) are usually tested in the field using tests executed during power-up cycles. Critical modules that are always in use (such as constant-use critical module 120), and that are operational for extended periods, are often required to be frequently tested during the application run-time of the critical module.

In some embodiments, the operating environment 100 is arranged using a megacell or a system-on-chip (SoC) which includes control logic such as a CPU (Central Processing Unit), a storage (e.g., random access memory (RAM)) and test controller 110. The CPU can be, for example, a CISC-type (Complex Instruction Set Computer) CPU, RISC-type CPU (Reduced Instruction Set Computer), or a digital signal processor (DSP). A processor can be a programmable digital module or any device that is used to process signals or data. The storage (which can be memory such as on-processor cache, off-processor cache, RAM, flash memory, or disk storage) stores one or more software applications (e.g., embedded applications) that, when executed by the CPU, perform any suitable purpose associated with the operating environment 100.

The test controller 110 is a diagnostic system and comprises logic (embodied at least partially in hardware) that supports monitoring, testing, and debugging of the modules 120, 130, and 140 that each execute software applications. For example, the test controller 110 can be used to apply production time testing wherein all the tests can be applied in one time duration without any interruptions. The test controller is also arranged to apply run-time field tests that are carried out only during the period when the application is idling (so as to not interfere with the normal processing of the processor-under-test, for example). Because the interleaved period is typically very small (a few tens of microseconds, for example), the test operation is interleaved with regular functional operation as shown below with reference to FIG. 2.

Figure 2:
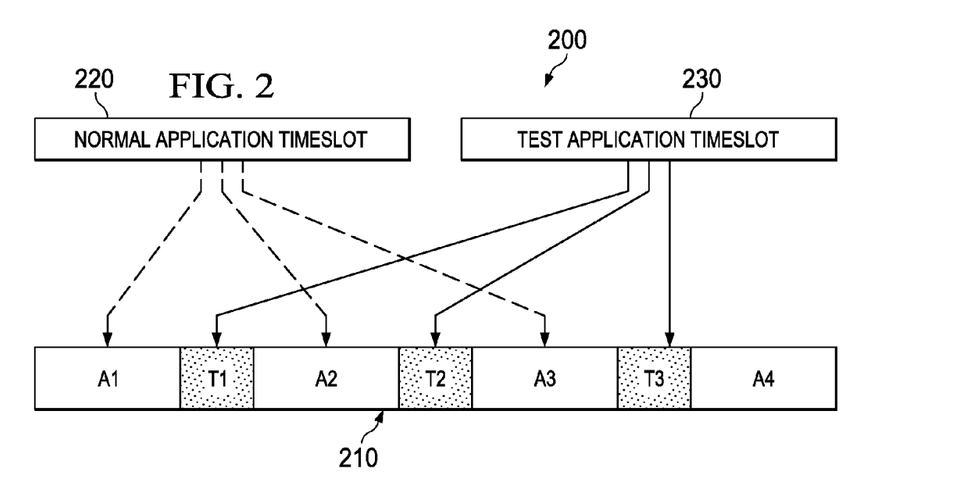
FIG. 2 is a timing diagram illustrating interleaved test operation for interruptible non-destructive run-time built-in self-test in accordance with embodiments of the disclosure.

FIG. 2 is a timing diagram illustrating interleaved test operation for interruptible non-destructive run-time built-in self-test in accordance with embodiments of the disclosure. Timeline 210 illustrates an interleaved operation of a processor and includes normal application time slots 220 and test application time slots 230. For example, normal application time slots 220 (at time periods A1, A2, A3, and A4) have interposing test application time slots 230 (at time periods T1, T2, and T3). The normal application processing requirements are apportioned in accordance with the capabilities of the processor executing the normal application such that a sufficient number of idle periods are available in which the interposed test application can successfully execute. This apportionment can be done based upon criticality requirements. For non-critical systems with no field test requirements, no such apportionment is normally needed.

The interposed test application is arranged to be interruptible such that it can be performed in the small intervals interspersed during normal system operation and during system idle time. Otherwise, a BIST (built-in self-test) run might impact the real-time nature of the system, and possibly adversely affect the functionality and performance of the system. Interruptible BIST capabilities help ensure that performance of the system is not impacted by the execution of the BIST system.

The disclosed BIST system includes an interruptible non-destructive run-time (IRT) built-in self-test (hereinafter referred to as IRT-BIST). The disclosed IRT-BIST is flexibly arranged to provide configurable options that provide generic BIST solutions without adversely increasing the total test time and impacting system performance while still meeting typical BIST goals of thorough fault-coverage and speed-of-test metrics.

Considerations associated with attaining a non-destructive, interruptible self-test mechanism include isolation of BIST logic from the rest of the design. For example, activity in the BIST-tested logic (logic which is tested using BIST) should not disturb the peripherals connected to it and vice-versa.

The disclosed IRT-BIST system addresses these considerations while facilitating integration of the IRT-BIST controller with application environment. As discussed above, the BIST (test) operation is partitioned into small intervals that are interspersed between system-active and idle periods. At the end of a BIST operation, the system non-destructively resumes operation from the point where the normal application was halted for BIST-based testing. Hybrid context save and restore operations use both software and hardware operations. The registers that cannot be loaded and stored functionally via software instructions are loaded and stored using processor hardware to maintain processing coherency when switching context from a normal application to a test application. The context save and the context restore operations are typically implemented using a input data register approach in which each operation typically executes within a single cycle of operation.

External interrupts to the system that occur during the BIST operation are saved (e.g., logged) and processed within the duration of minimum acceptable interrupt service latency. For example, loss of interrupts that occur during the test operation is prevented by logging interrupts during BIST execution and using a flexible programmable latency interrupt service to re-assert those interrupts when the processor returns to a normal (e.g., application) mode of operation. Support is provided for exiting a BIST operation in a next instruction cycle when a critical event such as a non-maskable interrupt, a time-out interrupt, an external reset, and the like are encountered. Thus, the response time to internal and external events is minimized.

The disclosed IRT-BIST system consumes a minimal amount of on-chip memory for test and minimizes the amount of time required to execute a BIST operation: The BIST operation is minimized to take a relatively short period of time so that it can fit into the minimum number of CPU idle cycles in an idle slot. A programmable macro-interval option is used to minimize the amount of time used to complete a BIST operation. The BIST operation can also be configured to minimize the memory required to store test stimuli and test response for BIST. The on-chip memory requirements are reduced by using deterministic scan-chain testing using PRPG (pseudo-random pattern generator) based test patterns an MISR (multiple input signature register) based response compaction (the PRPG and MISR alternately being used singly or in combination) for BIST operation. Thus savings in test execution time, test data volume, internal memory requirements for storage of test patterns, and other test data and control storage requirements are achieved The disclosed IRT-BIST system provides a relatively high level of defect coverage (as compared with conventional functional test methods since it is uses ATPG (automatic test program generation) tool generated test patterns. Structural test techniques (as compared with functional test techniques, for example) provide support for user configurable test coverage goals with a programmable test length. The IRT-BIST application test patterns are selected to obtain a sufficiently good defect coverage that provides a reasonable amount of confidence on the system.

When a failure is detected, the IRT-BIST controller provides an expedited notice of the detected failure so that the failure information is provided to the system in minimal time to contain error propagation (e.g., erroneous information that would otherwise be propagated through the system). Programmable intermediate comparisons allow a quick response to failures and reduce fault detection latency. A defective module can thus be identified by using a latency that is also programmable by the user.

A final golden signature that is stored in a memory mapped register (that, for example, which can be read by another processor in an electrically separate die) provides the ability to certify the correctness of the BIST-tested logic. The final signature comparison between an obtained signature and the stored final golden signature is normally performed in a separate die to maximize the assurance of the proper operation of the CPU.

Although IRT-BIST operation can be performed on an entire design (including an SoC) or a partial design such as a semi-custom core (e.g. CPU, DSP, and the like), the principles and applications of IRT-BIST apply also to a module-level component in a design. For simplicity of discussion, an embodiment is now described where (only, for example) the CPU is BIST-tested, while using IRT-BIST to test the remaining logic is not necessarily described. (Other embodiments BIST-test the entire portion of the design, for example, without loss of applicability of the teachings disclosed herein.)

Figure 3:
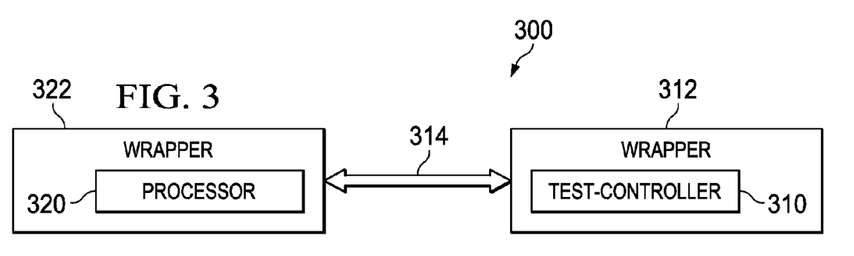
FIG. 3 is a block diagram illustrating test environment for interruptible non-destructive run-time built-in self-test of a processor in accordance with embodiments of the disclosure.

FIG. 3 is a block diagram illustrating test environment for interruptible non-destructive run-time built-in self-test of a processor in accordance with embodiments of the disclosure. Environment 300 illustrates various components of a IRT-BIST solution that address the above mentioned considerations associated with attaining a non-destructive IRT-BIST. Processor 320 is a module under test, and is a processor such as a CPU, DSP, and/or the like. Wrapper 322 is the wrapper logic that controls the processor 320 and relays the processor inputs and outputs. Test controller 310 is a test controller that supplies test inputs to the processor 320 and captures results generated in response to the supplied test inputs. Wrapper 312 is wrapper logic that controls and monitors the IRT-BIST operation. Wrapper 312 also controls the handshaking logic 314 between the processor 320 and test-controller 310. The details of the interaction between the modules and the associated wrappers are discussed below with reference to FIG. 4 and FIG. 5.

In conventional testing, customers have typically hand-coded the built-in self-tests using CPU-specific assembly-language instructions, which are normally very tightly coupled to a specific application. Such hand-coded tests are often referred to as SW (software) BISTs. The SW BISTs are run periodically to check the health of the device.

However, the use of SW BISTs includes drawbacks such when as the SW-BISTs have to be rewritten in accordance with each specific application, which often consumes a significant amount of effort and time for development. Also, generating optimized tests to reduce the test time and memory requirements often consumes a considerable amount of design effort. Because the SW BISTs are processor-specific, developing test scenarios and test patterns also requires full understanding of specific CPU architecture including pipeline stages (which typically are different for each type of CPU). In addition to the test coverage with such tests being relatively low, the SW BIST tests are difficult to incrementally add or remove to meet different coverage requirements or to target coverage of specific functional conditions.

Further, simply executing generic instructions in SW BIST does not completely guarantee proper functionality of CPU because the logic cone excitation (e.g., which includes the logic that is exercised by virtue of the test software) can differ as a result of a change in sequences of instructions and changes in data (e.g., operands to instructions). When the tests and the actual application excite logic cones differently, the degree in confidence of such SW BIST results is reduced because there is no simple way of assigning coverage metrics to such tests, since the process of fault grading these sequences for different fault models is time consuming and often infeasible.

Scan-based field self-test mechanisms have also been used in the past for field self-test and are often referred to as hardware BIST (HW BIST). However, the conventional HW BIST solutions do not provide the interruptible non-destructive BIST features as disclosed herein.

Figure 4:
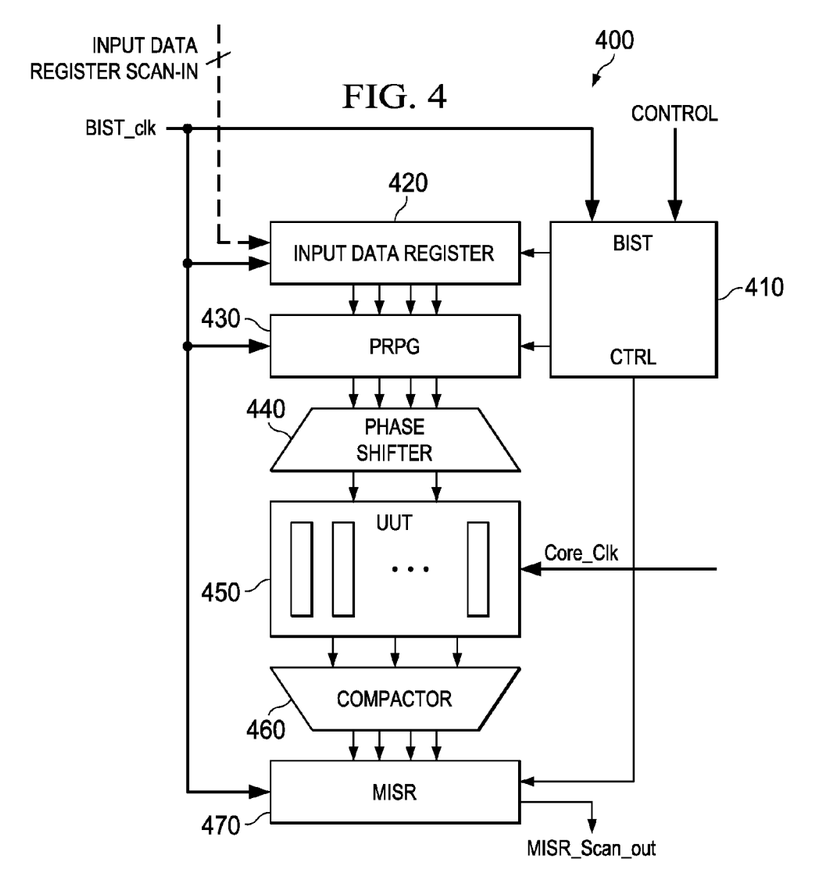
FIG. 4 is a system-level diagram illustrating a hardware-based BIST scan-compression architecture used in accordance with embodiments of the present disclosure.
Figure 5:
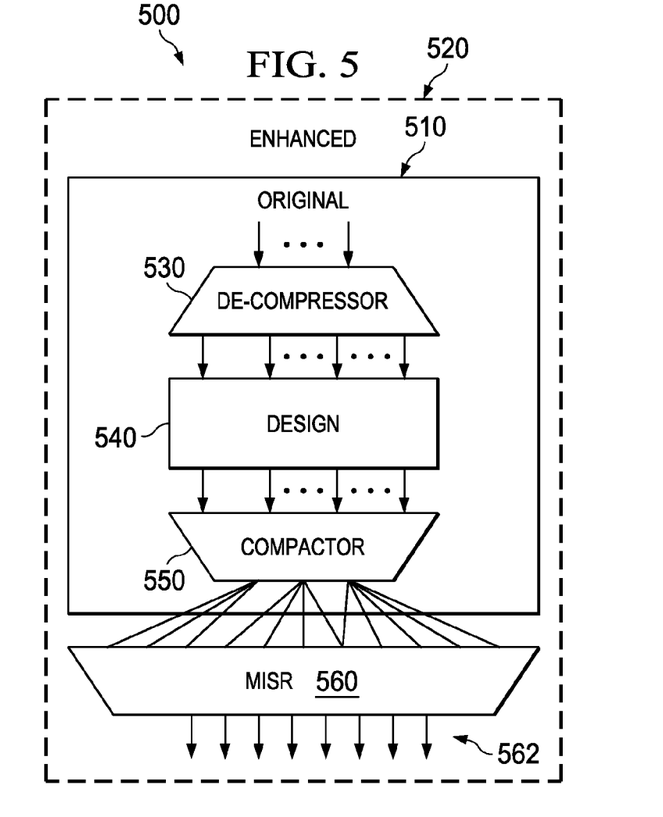
FIG. 5 is a system-level diagram illustrating an alternate hardware-based BIST scan-compression architecture used in accordance with embodiments of the present disclosure.

FIG. 4 is a system-level diagram illustrating a hardware-based BIST scan-compression architecture used in accordance with embodiments of the present disclosure. Scan-compression architecture 400 is arranged to reduce the amount of on-chip memory that would otherwise be used for pattern storage. Several architectures for scan compression exist. The embodiments in this disclosure are generic and are applicable to any architecture. For example, two such architectures are shown in FIG. 4 and FIG. 5 that depict scan-compression solutions to provide deterministic BIST patterns.

Scan compression architecture 400 includes a BIST controller 410 that is arranged to coordinate proper execution of the included components in conjunction with a BIST clock (BIST_clk) signal. The BIST controller 410 is coupled to a data input register 420 that is used to initialise the PRPG (pseudo-random pattern generator) 430 as used under the control of the BIST controller 410. Thus the PRPG 430 is arranged to generate new test vectors as requested during a test application.

The PRPG 430 is coupled to a phase shifter (e.g., data expansion logic using XOR gates designed to reduce correlation between PRPG outputs) 440 for providing the output of the PRPG 430 as stimulus for testing UUT (unit under test) 450. The UUT is clocked by a core clock (Core_Clk) and is arranged to perform an application test in response to the output of the PRPG 430. The phase shifter 440 is a block of combinational logic that converts a one-dimensional stream of pseudo random patterns from the PRPG 430 into a two dimensional array of values in the phase shifter 440 that is used to load parallel scan chains of the UUT 450. A test vector pattern is loaded completely when all the flip-flops used in the scan chains have been initialized. The generated test vector patterns are used as stimulus for the UUT 450 and response data (generated in response to an asserted test vector pattern) is captured into the same flip-flops in the scan chains of UUT 450.

The captured data is retrieved from the scan chain outputs and loaded into a compactor 460 (e.g. data compaction logic consisting of XOR gates designed to merge scan chains outputs) that compacts the test outputs with no loss of the information that is captured into the flip-flops. The compacted output is transferred from the compactor 460 to the MISR (multiple input signature register) 470. The MISR 470 provides the signature (or an indication of the signature) in response to a signal from BIST controller 410 that is compared at the end of an interval with a predetermined golden signature (or an indication of the golden signature) generated by a reference (e.g., fault-free) design. Such comparisons are performed at intervals controlled by BIST controller. An interval can be one pattern or a set of patterns. The size of the interval decides how frequently the MISR output must be scanned out and the corresponding latency of error detection. Any mismatch between the signature and the golden signature indicates that at least one erroneous value was captured and unloaded from the scan chains.

Scan-compression architecture-based field self-test is supported for by providing enhancements such as PRPG initialisation through the device internal interface to the BIST controller, internal signature storage and comparison, use of internal clocks, minimizing the number of external control signals, and the like. Another scan-compression architecture illustration is shown in FIG. 5.

FIG. 5 is a system-level diagram illustrating an enhanced hardware-based BIST scan-compression architecture used in accordance with embodiments of the present disclosure. Enhanced hardware-based BIST scan-compression architecture 500 is arranged to permit interruptible non-destructive field self-testing. An original portion 510 (including de-compressor 530, design 540, and compactor 550) is combined with an enhanced portion 520 (including an enhanced MISR 560). The enhanced portion 520 provides a scan-compression solution coupled with an MISR 560 at the output for additional reduction in the test data output and thereby additional savings in the memory required.

Scan-compression architecture has different forms of combinational and sequential logic in the decompressor and compactor. The embodiments in this disclosure to support interruptible run-time (IRT) BIST can be used for any scan compression architecture.

The connections between MISR 560 and compactor 550 can be made to minimize the test data flow from design 540 to external test outputs 582. Compactor connections to the MISR 560 are also selected such that a minimized amount of MISR cancellations occur due to aliasing.

In various embodiments, the IRT-BIST scan-compression architecture provides for handling static or timing unknowns ("Xs") during test application. The control logic for handling such unknowns is loaded with data that is provided in different cycles and using different test data inputs and test controls based upon the selected scan-compression architecture. The embodiments in this disclosure can be used across any of such schemes.

Figure 6:
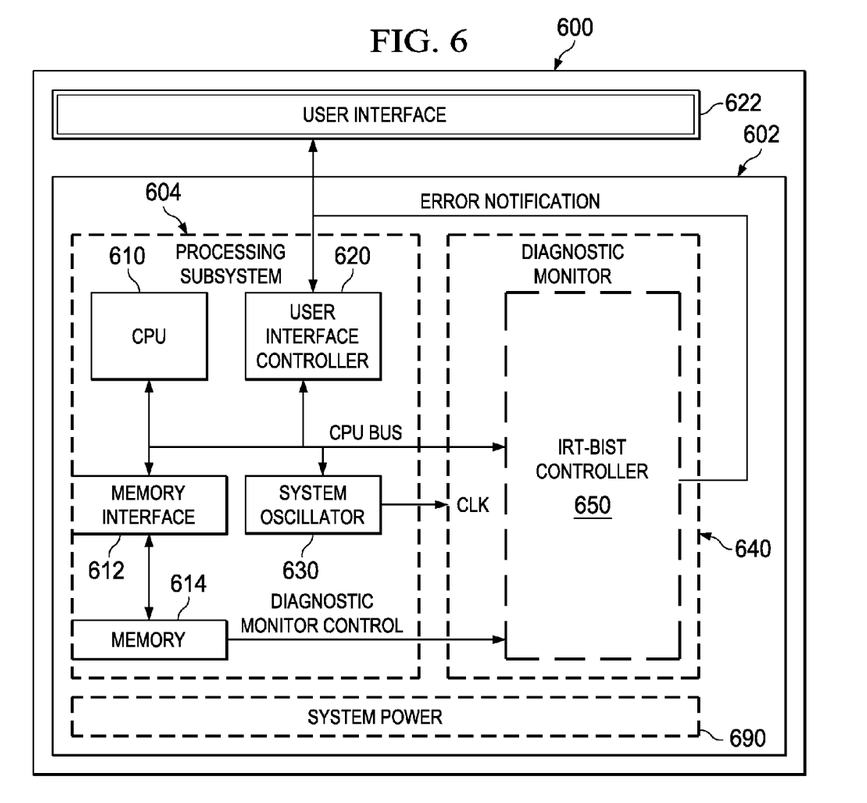
FIG. 6 is a block diagram illustrating relative functional isolation of a diagnostic monitor with respect to a processing subsystem to be tested in accordance with embodiments of the present disclosure.

FIG. 6 is a block diagram illustrating relative functional isolation of a diagnostic monitor with respect to a processing subsystem to be tested in accordance with embodiments of the present disclosure. For example, any activity in the CPU 610 during the IRT-BIST run should not disturb the peripherals (e.g., user interface controller 620, user interface 622, memory 614, and the like) coupled to the CPU 610. The peripherals should be isolated completely from CPU activity during IRT-BIST. When IRT-BIST is run, the CPU 610 operational outputs assume a random state and change every cycle. To avoid spurious device operation, the peripherals coupled to the CPU are isolated from the CPU 610. Similarly, the operational inputs to the CPU 610 are isolated during the IRT-BIST run, for example, to prevent affecting the test results generated in response to scanned-in test patterns.

Computing system 600 is illustrated as including a common substrate 602 upon which the illustrated elements of the computing system 600 are formed. Forming the illustrated elements of the computing system 600 on the common substrate 602 provides increased integration and reduces the number of connections for which drivers, bonding pads, and wiring would otherwise be used. In various embodiments, the included elements are implemented within the same SOC in a single die, or across different SOCs or chips in multiple dies which are assembled together into a stack, or in separate circuit boards and packages (supported through an appropriate user interface 622). System power 690 is used to power both the elements of substrate 602 and the user interface 622 (such as a dashboard indicator or a failure code reader interface), although the user interface 622 can be partially or completely powered by another power supply.

The processing subsystem 604 (which is also a processing system in its own right) of substrate 602 typically includes a CPU 610, a user interface controller 620, a system oscillator 630, an diagnostic monitor 640, and system power 690 (as described above). CPU 610 is a DSP, controller, microprocessor, or the like, and is used to control at least the processing subsystem 604. CPU 610 is typically coupled to a memory interface 612 that is arranged to control accesses to memory 614. The memory interface is additionally arranged to permit DMA ("direct memory accesses") of the memory 614 by subsystems such as the user interface controller 620 and diagnostic monitor 640 without intervention by the CPU 610. The memory 614 is arranged to store information used by CPU 610 (to control a braking process of a vehicle, for example) and information that is used for control and operational parameters for the diagnostic monitor 640 (to verify a diagnostic output of the processing subsystem 604).

The CPU 610 is arranged to at least partially control a CPU bus, which typically includes a data portion, an address portion, and a control portion. The control portion of the CPU bus also includes status signals that indicate when the CPU 610 is active or in an idle state. The IRT-BIST controller 650 (of the diagnostic monitor 640) is arranged to receive the status signals and determine when the CPU 610 is in an idle state, for example.

The user interface controller 620 is arranged to prepare commanded information for display and to generate video control signals used to control the user interface 622 so that the commanded information can be displayed. The commanded information includes operational parameters, such as levels-of-coverage, module-criticality, power-saving modes, and the like. The user interface controller 620 is arranged to receive commanded information from a user via the user interface 622 so that the commanded information can be input to the CPU 610. In various embodiments, the user interface controller 620 is arranged to perform DMA accesses of memory and/or receiving commanded information from the CPU 610.

The diagnostic monitor 640 provides a degree of assurance that the processing subsystem 604 (such as CPU 610) continues to operate properly. The diagnostic monitor includes the IRT-BIST controller 650 that is arranged to (at least) periodically monitor the performance of the CPU 610 of the processing subsystem 604. The IRT-BIST controller 650 receives test parameters from the CPU 610 (or via DMA from memory 614) to be used in generating test applications for monitoring the "health" (e.g., operating correctness) of the CPU 610.

As discussed above, monitoring of safety-related processing is especially important. The safety-related processes include processes such as controlling a braking process for stopping a vehicle (e.g., to avoid locking the rotation of wheels of the vehicle while pressure is being applied to the brake pedal). Upon detecting an error in response to an evaluation of the CPU 610, the diagnostic monitor 640 can, for example, output an error signal that is to be passed on to another microcontroller for further action, to activate an LED on the dashboard, and to provide a signal to electrically disable and/or reset the monitored system (and/or allow backup systems to operate) in the event of an error.

The diagnostic monitor 640 is arranged to receive commands from the CPU 610 or is pre-programmed (e.g., using "flash" memory) to provide metrics for the evaluation of the diagnostic output. In one example, the diagnostic monitor 640 includes a wrapper for receiving parameters to be used to execute scan-chain testing during idle periods of CPU 610. In various embodiments, the CPU 610 can perform the programming and reading of registers of the diagnostic monitor 640 (including test data input registers, minimum and maximum time periods for executing test applications, and the like).

The diagnostic monitor 640 can also receive commanded information by performing DMA accesses of memory and/or receiving such information from the CPU 610. The memory accesses also can be used to perform and/or communicate test patterns and comparison vectors and/or "golden signatures" for evaluating test results over time.

As a general principle, the execution of IRT-BIST test applications is seamlessly integrated into the application environment. Thus the BIST test applications are scheduled to run in idle slots that occur during CPU execution. The overall BIST test is divided into small intervals that are interspersed and arranged for execution during the CPU idle periods. Depending upon the scan architecture implemented, each compression-scan pattern (or a set of such patterns) is a separate entity, which allows interruptible capability after every pattern (or pattern set) run. By using relatively small scan chain lengths, the minimum test slot can be reduced to few clock cycles (e.g., so as to fit within a relatively short idle period). Accordingly, the test slot duration can be as small as one pattern application time so that even relatively short idle periods in the application environment can be used executing IRT-BIST test applications.

For non-destructive testing, the entire functional state of the CPU 610 is saved before triggering an IRT-BIST cycle. The entire functional state of the CPU 610 is then restored before resuming the normal application so that the application resumes from where it was stopped for the IRT-BIST test application. The IRT BIST architecture implements the context save and context restore operations using a combination of software and hardware techniques. The context save and restore operation is supported in software for registers which can be loaded and stored functionally using CPU instructions. Likewise, (hardware) input data registers have been added to support context save and restore operations for registers that cannot be (or are not) saved using software.

Figure 7:
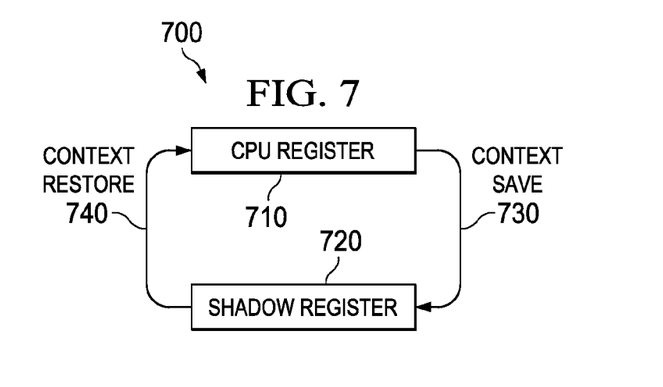
FIG. 7 is a state diagram illustrating context save and context restore operations using hardware in accordance with embodiments of the present disclosure.

FIG. 7 is a state diagram illustrating context save and context restore operations using hardware in accordance with embodiments of the present disclosure. State diagram 700 includes a CPU register 710 that holds information affecting the state of CPU 610, for example. When a test application is invoked, the information in CPU register 710 is saved in shadow register 720 using context save 730 operation. The test application often changes the value of CPU register 710, which would otherwise irreversibly destroy the state of CPU 710. When the test application finishes executing, the information stored in shadow register 720 is restored in CPU register 710 using context restore 740 operation.

Both the context save 730 operation and the context restore 740 operation are typically executed in a single clock cycle, which minimizes the time used to perform a context switch. Having more input data registers increases the area of the UUT, whereas using more software instructions to save register states increases the duration of time used to perform a context switch.

Likewise intermediate states (context and result) of IRT-BIST test applications can be saved and restored such that the BIST test application itself can be resumed after it is, for example, interrupted by an external event or resumption of the normal application. In an embodiment, the context and/or results are saved by shifting in the last shift data of the previous test slot, when IRT-BIST test application is resumed in next (idle slot used as a) test slot.

In order to minimize any potential disturbance to the normal application, the response time to any event occurring during a test application time slot is kept to a minimum value in accordance with the type of event that occurs. For example, any (maskable) external interrupts to the CPU during the IRT-BIST operation are saved (and thus not ignored) during the test operation. When (non-maskable) interrupts occur during a test application, the IRT-BIST operation is interrupted as early as possible and the interrupts are serviced with minimized interrupt service latency.

In an embodiment, the amount of time for which interrupts wait for servicing is made programmable to the user. The amount of time for which interrupts wait for servicing is referred to as the micro-interval (see, for example, micro-interval 1350 of FIG. 13).

Figure 8:
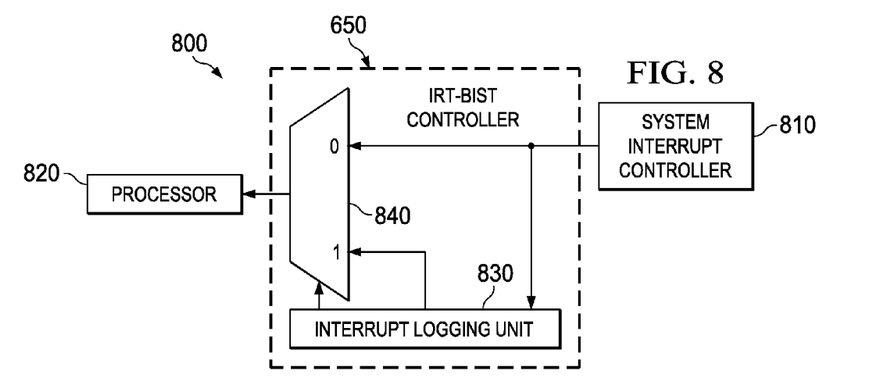
FIG. 8 is a schematic diagram illustrating an interrupt logging system in accordance with embodiments of the disclosure.

FIG. 8 is a schematic diagram illustrating an interrupt logging system in accordance with embodiments of the disclosure. Interrupt logging system 800 includes a system interrupt controller 810, a processor 820, and IRT-BIST controller 650 that includes an interrupt logging unit 830 and a multiplexer 840. IRT-BIST controller 650 is arranged to log any interrupts generated by system interrupt controller 810 for the processor 820 during IRT-BIST operation (within a micro-interval, for example).

Interrupt logging unit 830 logs each interrupt that occurs during a test application such that no interrupts are lost during IRT-BIST operation when the processor 820 is not able to service those interrupts. At the end of every micro-interval, the logged interrupts are re-issued by the interrupt logging unit 830 via multiplexer 840 and provided to the processor 820 after the context restore is complete.

When no interrupts occur during a test application, the IRT-BIST operation is continued and executed without interruption. In an embodiment, the micro-interval can be programmed to be as low as one pattern execution duration. Programming the micro-interval to be the duration of the execution of one pattern allows a very low response time to external interrupts during an IRT-BIST run. For a CPU core with 2000 registers, a minimum execution time as low as 20 cycles (excluding CPU context save and restore operations) has been achieved.

When an NMI (non-maskable interrupt) occurs, the system is allowed to immediately (e.g., expeditiously) respond. When the processor 820 receives the NMI, and the IRT-BIST operation is halted immediately (for example, after completion of a pattern execution, or even before the completion, thereby aborting the execution of a given pattern) after which the processor 820 is restarted. Halting the execution of completion of a pattern execution avoids exiting the IRT-BIST while executing a pattern, which would corrupt the MISR 560. When an NMI occurs in during an execution of a test pattern, the interrupted test is restarted from beginning of the test the next time an IRT-BIST test application time slot is encountered.

As discussed above, cost and performance considerations often lead to the inclusion of a minimal amount of memory that is used to store input/output data for IRT-BIST while expending a minimal amount of time for an IRT-BIST operation so that the IRT-BIST test application can be executed with a contiguous period of CPU idle cycles.

To decrease the interrupt service latency, each IRT-BIST application test is designed to run for as small amount of time as possible so that at the end of IRT-BIST interval any interrupts that occur during the IRT-BIST run can be serviced with a minimum of latency. However, exiting the IRT-BIST test application run after every few patterns increases the overall test time because of the latency (e.g., overhead) involved in the context save and restore operations that occur between every IRT-BIST run. Accordingly, the macro-interval (see, for example, macro-interval 1360 of FIG. 13), which is the maximum amount of time IRT-BIST can run continuously in the absence of interrupts. Once an IRT-BIST run is triggered by the processor 820, processor execution does not return to a main application thread until a macro test interval is complete or unless there are pending interrupts.

When the IRT-BIST operation is continued and executed without interruption, test results are evaluated to determine failure information. The failure information is provided to the system in minimal time so that the propagation of the fault itself to other parts of the system is relatively contained. In typical BIST operations, the computed signature is compared against golden signature at the end of the test to certify that the device is functioning correctly. Because the end of the test comparison as IRT-BIST operation can be interrupted to service functional interrupts during test operation, the faulty behavior of the processor 820 is to be detected in the least amount of time as possible to contain the effects of the fault.

In an embodiment, the computed signature is compared with the golden signature after every few patterns to reduce the error detection latency (e.g., the degree to which the fault itself can propagate through the system). The number of patterns after which a comparison is done is configurable. However, the increase in the number of patterns for purpose of comparison (resulting from a smaller number of patterns after which the comparisons are made) increases the memory used to store the patterns. Likewise, the cumulative signature is also compared at the end of test to certify the correct operation of processor 820.

Often safety considerations are such that the signature is validated and the correctness of CPU is assured through logic operating in an electrically separate die. When intermediate compares that are performed in the BIST controller 650 pass, the final golden signature is written to a memory mapped register that is read by another CPU in an electrically separate die (per safety requirements). Thus, the final signature comparison is performed in another die, which re-assesses the correct operation of the processor 820.

The collection of the test applications is selected to provide a reasonable amount of confidence about the correctness of operation of the system. A reasonable amount is determined by obtaining a relatively high fault/defect (e.g., high fault and/or defect) coverage such as a coverage of over 99% for a "stuck-at-" type fault model. The reasonability of the test application collection is also determined in view of the criticality and safety requirements of the module being tested.

Common industrial practices use 99% stuck-at coverage for virtually guaranteeing that the design is free of defects. However, the pattern count "exponentially" inflates as the coverage reaches near 99% (empirical results for a typical design reveal that a threefold increase in test patterns results from raising a 95% coverage level to a 99% coverage level). Because the IRT-BIST is performed on already defect-free tested design (such as testing in the assembly process or a power-up test as compared with testing during runtime operation), it is not typically required to run IRT-BIST operation to obtain a 99% coverage level. The BIST operation is programmed to run so as to obtain a selected coverage that reflects a desired confidence level.

In an embodiment, the disclosed IRT-BIST system supports user-configurable targeted-coverage to reduce the total test time during runtime. For example, a complete check at start-up is performed using a targeted-coverage option of 99%, while targeted-coverage option having lower percentages of coverage can be selected. When the application of modules permits (e.g., lower safety requirements) test applications having targeted-coverage option of 95% are run on few modules very frequently in less time, while more-critical portions of the design are tested more frequently and/or using higher percentages of coverage.

Figure 9:
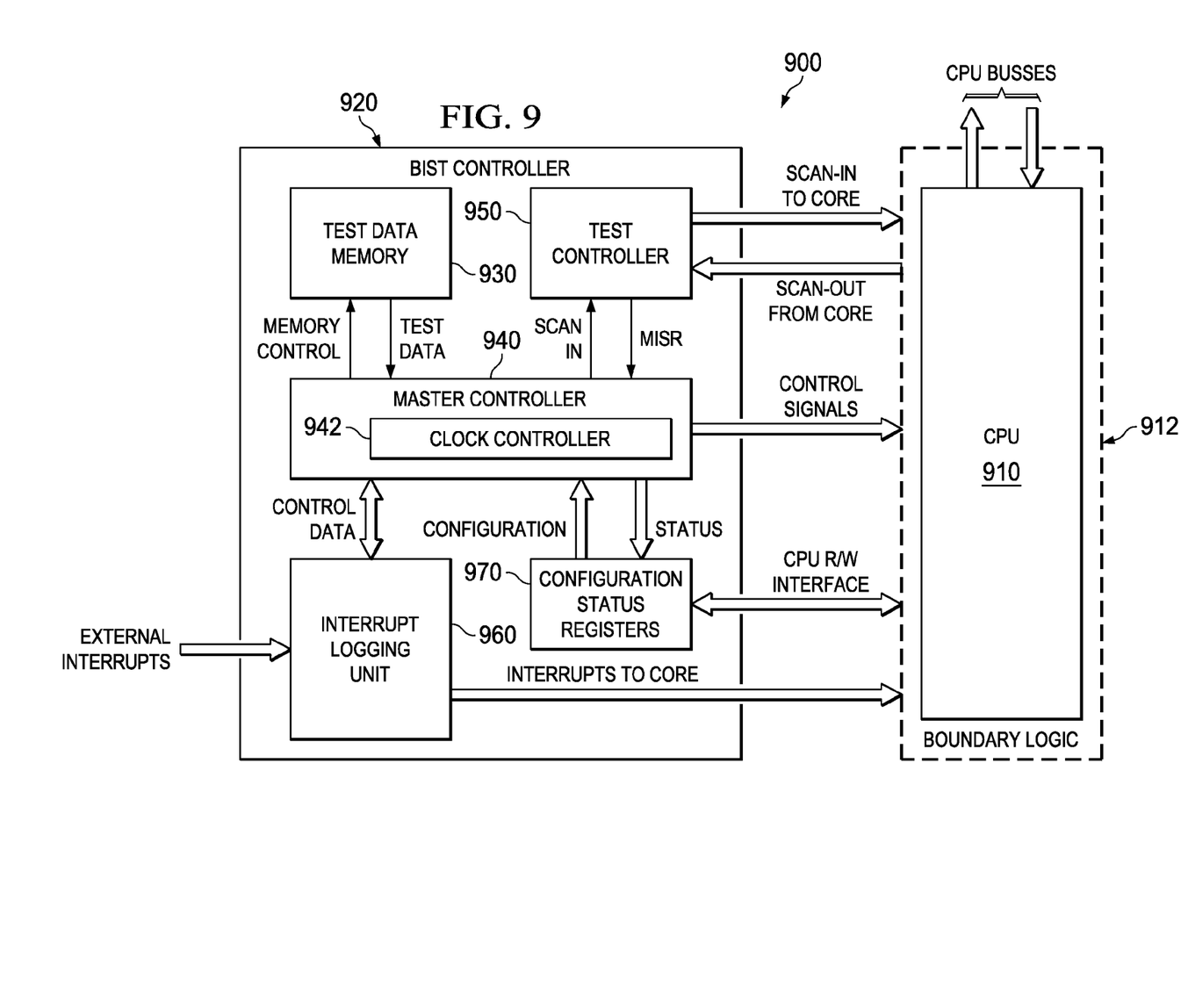
FIG. 9 is a block diagram illustrating an interruptible real-time built-in self-test controlled system in accordance with embodiments of the disclosure.

FIG. 9 is a block diagram illustrating an interruptible real-time built-in self-test controlled system in accordance with embodiments of the disclosure. IRT-BIST system 900 includes a CPU 910 and an IRT-BIST controller 912. CPU 910 is coupled to an interface 912 that includes bounding logic (including boundary-scan logic) for communicating with the IRT-BIST controller 930.

IRT-BIST controller 920 includes a master controller 940 that is arranged to sequence and control the operation of the IRT-BIST controller 920. Clock controller 942 provides one or more clocks used to generate control signals that are arranged to synchronize components of IRT-BIST controller 920 including the master controller 940 itself. The clock controller module 942 also controls the clock provided to the core of CPU 910 during IRT-BIST operation. Based on the programmed maximum chain length, the clock controller module 942 generates the shift and capture pulses. The clock controller module 942 also supports clocking for different test modes such stuck-at fault ATPG (automated test pattern generation) and transition fault ATPG using LOS (launch-off shift) and LOC (launch-off capture) techniques.

Master controller 940 is coupled to a test data memory 930 that is arranged to store test patterns. Memory control signals from master controller 940 are arranged to retrieve selected patterns (test data) from test data memory 930 for testing CPU 910. Master controller 940 forwards the retrieved test patterns using a scan input interface to the test controller 950 (which includes similar functions to the MISR 470 and 560 discussed above). The test controller 950 is arranged to assert the scan-in test patterns via a scan-in to core interface of boundary logic 912. The test controller 950 is also arranged to receive scan-out test patterns (e.g., test results) from via a scan-out from core interface of boundary logic 912.

Master controller 940 is coupled to interrupt logging unit 960, which is similar to interrupt logging unit 830 discussed above). Interrupt logging unit 960 is arranged to log each interrupt that occurs during a test application such that no interrupts are lost during IRT-BIST operation when the processor 910 is not able to service those interrupts. At the end of every micro-interval, the logged interrupts are re-issued by the 960 interrupt logging unit via the interrupts to core interface and provided to the processor 910 after the context restore is complete.

Master controller 940 is coupled to configuration status registers 970 via a configuration interface ("config") and a status interface. Using a CPU R/W (read/write) interface, the configuration status registers 970 receives, stores, and provides the values that are configurable by CPU 910 (e.g., for storing parameters of test applications of IRT-BIST). Parameters for the BIST operation (such as the micro and macro-interval durations and the selected targeted-coverage options—which in turn translate into the number of patterns—for which BIST is to be run) are programmed by the CPU 910 using selected registers of the configuration status registers 970. The configuration status registers 970 also includes IRT-BIST status registers to which the self-test controller provides updates to maintain a current IRT-BIST run status (such as the pass/fail status of intermediate comparisons, codes for reasons for exiting the current IRT-BIST run, the number of patterns executed, and the like).

The master controller 940 controls the overall operation of BIST using information stored in the configuration status registers 970. The master controller 940 includes a master state machine that starts from a state that is determined in response to the value of the configuration register BIST_GO (built-in self-test go). The master controller 940 generates enable/disable signals in boundary logic 912 for enabling or disabling the core of CPU 910 based on the current state of the master state machine.

The master controller 940 also reads the data from memory and supplies a de-compressor structure (such as de-compressor 530, discussed above). After the desired programmable number of patterns has been executed, the master controller 940 performs the current MISR signature comparison with the golden MISR signature and generates pass/fail data.

Figure 10:
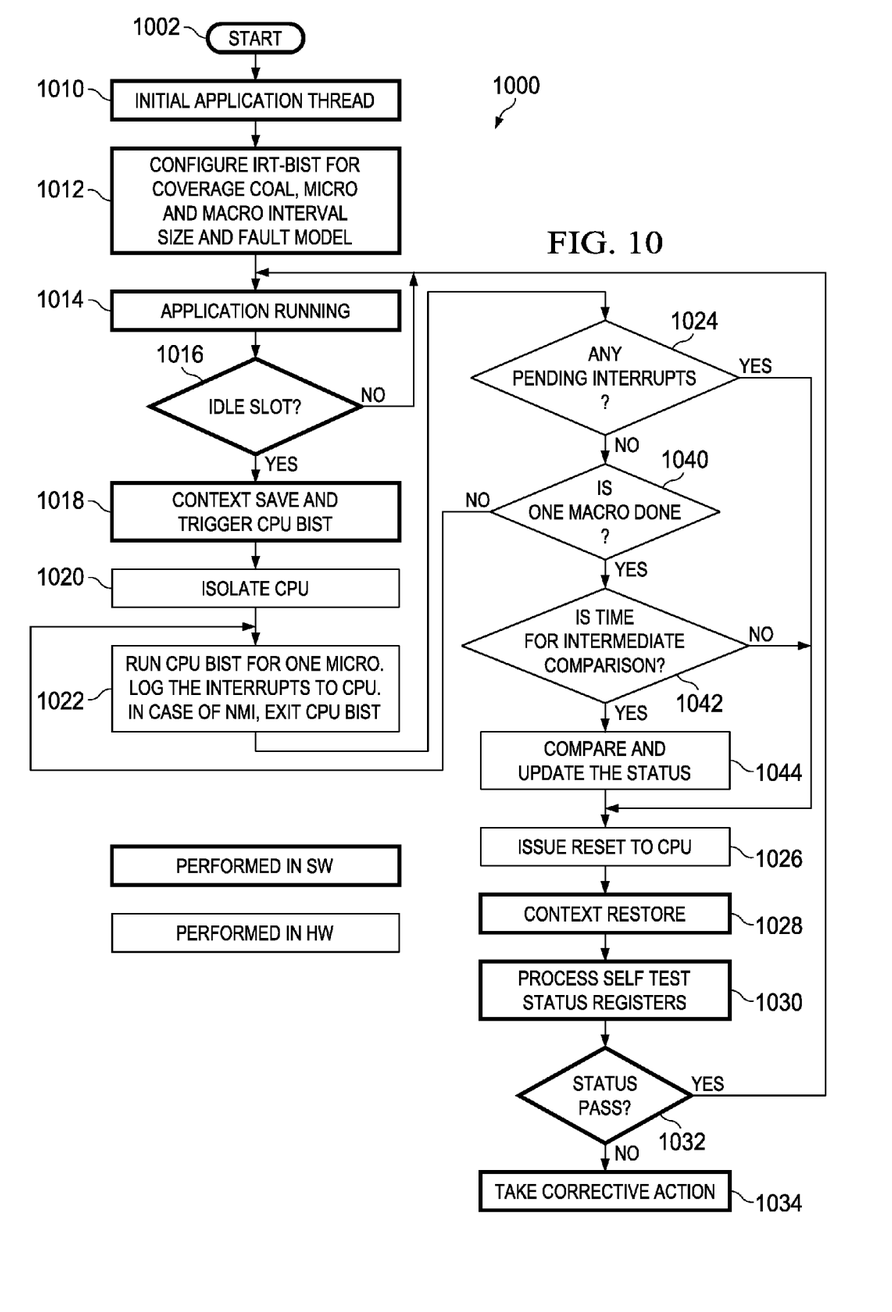
FIG. 10 is a program-flow diagram illustrating operation of a non-destructive, interruptible, real-time, built-in self-test system in accordance with embodiments of the present disclosure.

FIG. 10 is a program-flow diagram illustrating operation of a non-destructive, interruptible, real-time, built-in self-test system in accordance with embodiments of the present disclosure. While various portions of the flow execution of IRT-BIST in an application environment are described as being performed in hardware or software, the various portions are performed in various combinations of hardware and software (the degree to which is determined by a particular embodiment). The program flow is initiated at the start terminal 1002 and proceeds to operation 1010 where the initial application thread is instantiated.

In operation 1012, the IRT-BIST system is configured for targeted coverage goal, micro-interval and macro-interval size and fault model type (stuck-at type, transition type, and the like). After such configuration, the process flow continues with operation 1014.

In operation 1014, it is determined whether a (normal) application is running, or whether an idle slot exists in the execution of a CPU under test. In operation 1016, the program flow triggers IRT-BIST operation if an idle slot exists and proceeds to operation 1018; if an idle slot does not exist, the program flow proceeds to operation 1014.

In operation 1018, the context of the CPU under test is saved and the CPU BIST is triggered. The BIST start routine saves the context of all the selected memory mapped registers to memories (thus performing a software context save). The BIST start routine sets the to the BIST_GO register bit in the configuration status register of the BIST control to trigger IRT-BIST. The control signals asserted by the triggering of the IRT-BIST initiate a hardware context save into the input data registers of the CPU under test. Program flow continues in operation 1020.

In operation 1020, under the control of the BIST controller, the CPU under test is isolated from normal inputs and provides stimulus sufficient for executing a test application during the idle slot. Program flow continues at operation 1022, where a test application is executed as a IRT BIST for one micro-interval, which is a maximum interrupt service latency duration. Any occurrence of an external NMI for the core of the CPU under test at any point during BIST execution, IRT BIST exits immediately (regardless of whether program flow is currently executing operation 1022). However, exiting the BIST run immediately (in between a pattern) can corrupt the MISR, and to avoid such corrupt, the current set of test patterns is restarted from the beginning in the next run of IRT-BIST. After an NMI is encountered, the core is reset during BIST run and the self-test controller is reset in similar fashion to operation 1026 and the following operations. The test is restarted from the beginning of the test the next time BIST is triggered. Program flow continues at operation 1024 if an NMI has not been encountered.

In operation 1024, the BIST controller determines whether any pending interrupts were asserted that have been logged by the interrupt logging unit during the test application executed during the a micro-interval, the IRT BIST controller checks if any interrupts have been logged by interrupt logging unit during the micro test slot, and terminates the BIST run in case of pending interrupts. Program flow continues in operation 1026 if there are pending interrupts, or else the program flow continues in operation 1040.

In operation 1040, the BIST controller determines whether one macro-interval test has been completed. If one macro-interval test has not been complete, program flow continues in operation 1022. If one macro-interval has been completed, program flow resumes in operation 1042.

In operation 1042, the BIST controller determines whether the selected number of patterns for full coverage has been applied (e.g., whether it is time to perform intermediate comparisons). When the selected number of patterns for full coverage has not been applied, program flow continues in operation 1026 after which the IRT BIST is halted, in order to resume executing the main application thread. When the selected number of patterns for full coverage has been executed program flow continues in operation 1044 when MISR comparison is done automatically by the BIST controller after the selected number of patterns has been executed. Intermediate signature comparison is performed to reduce the failure detection latency. Intermediate signature comparison includes accumulating an intermediate result that is subsequently evaluated by comparing the intermediate result with a predetermined reference pattern Program flow continues in operation 1026 after which the IRT BIST is halted, in order to resume executing the main application thread and update the status as to whether a failure in the comparison has been detected.

In operation 1026, IRT-BIST is terminated when the BIST controller issues a reset to the CPU core. (In an embodiment, the reset signal coupled from the core to the peripherals is blocked in the design). Program flow continues at operation 1028.

In operation 1028, the CPU-under-test branches to an appropriate boot routine that contains instructions to restore the registers saved during context save operation. Program flow continues at operation 1030.

In operation 1030 (after the context restore operation is complete), the control is transferred back to the main application thread from where IRT-BIST was triggered. If there are any pending interrupts, the IRT-BIST controller re-issues all the interrupts that were logged during the IRT-BIST run. Program flow continues at operation 1032.

In operation 1032, the CPU determines the status of IRT-BIST run and proceeds to operation 1014 when a status of pass is indicated. When failure status is indicated, program flow continues at operation 1034 where a corresponding action is taken. Examples of corresponding actions include: logging the error and applying a system reset, placing the system into a "safe" mode, providing an indication on a user interface, and the like. Thus program flow continues until the system is halted or an error occurs.

Figure 11:
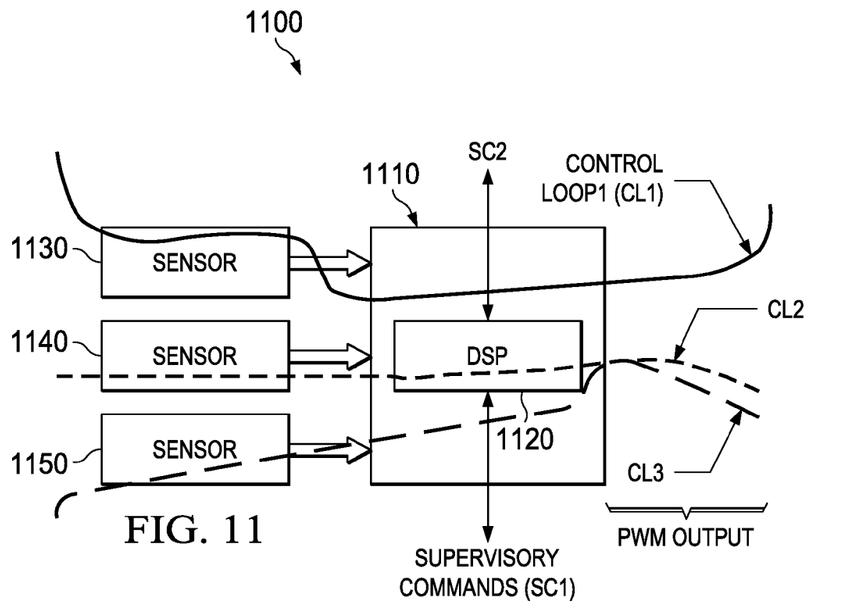
FIG. 11 is a block diagram illustrating a typical control system using a non-destructive, interruptible, real-time, built-in self-test system in accordance with embodiments of the present disclosure.

FIG. 11 is a block diagram illustrating a typical control system using a non-destructive, interruptible, real-time, built-in self-test system in accordance with embodiments of the present disclosure. In the illustrated control system 1100, processor 1110 includes a DSP 1120 that is coupled to sensors 1130, 1140, and 1150. Data from the sensors 1130, 1140, and 1150 is captured and analyzed by the DSP 1120 core and the response is sent through modulated output through PWM (Pulse Width Modulated) outputs (e.g., CL1, CL2, CL3). Each of these loops is executed periodically. There are also typical non-periodic supervisory command loops (e.g., SC1, SC2) for interacting with other modules in the system. The supervisory command loops are arranged to monitor and/or control external processes or modules in a control system.

The supervisory command loops are executed within a stipulated amount of time to ensure proper functioning of the system. Any unintended delay introduced supervision of the command loops in the system can lead to catastrophic failures depending on the application environment. It can be observed from FIG. 12 (discussed immediately below) that there are available timeslots of idle time interspersed between periodic and non-periodic events.

Figure 12:
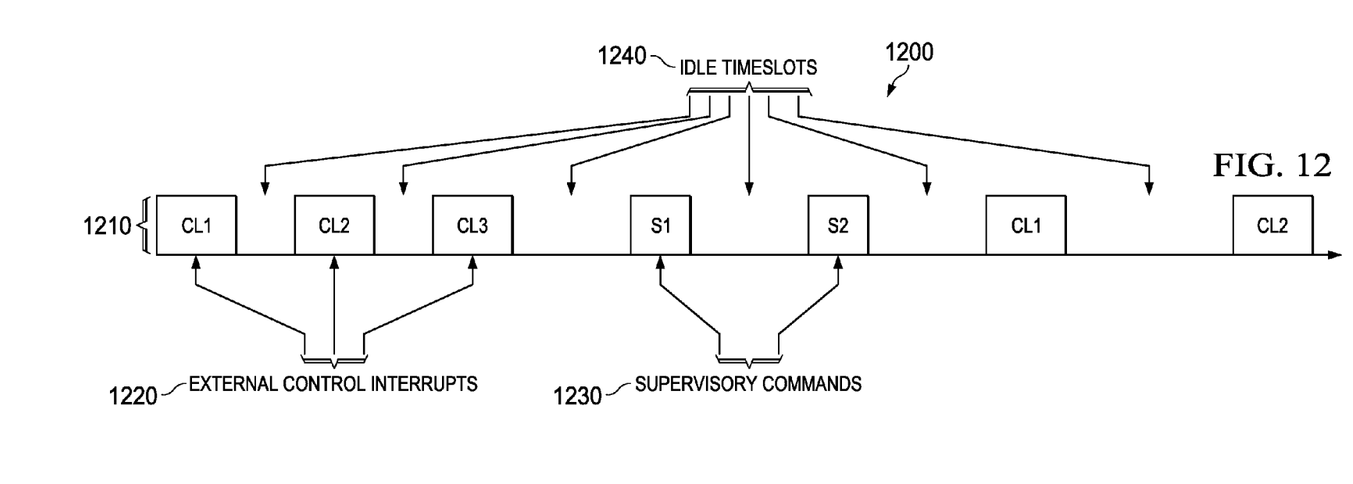
FIG. 12 is a timing diagram illustrating available timeslots into which test operations for interruptible non-destructive run-time built-in self-test are to be interspersed in accordance with embodiments of the disclosure.

FIG. 12 is a timing diagram illustrating available timeslots into which test operations for interruptible non-destructive run-time built-in self-test are to be interspersed in accordance with embodiments of the disclosure. For example, timeline 1210 includes timeslots for external control interrupts 1220 (such as for managing feedback-based command loop systems), timeslots for supervisory commands 1230 (such as for managing external processes or modules in a control system), and idle timeslots 1240. As discussed immediately below (with respect to FIG. 13) test operations for interruptible non-destructive run-time built-in self-test are interspersed using the idle timeslots 1240.

Figure 13:
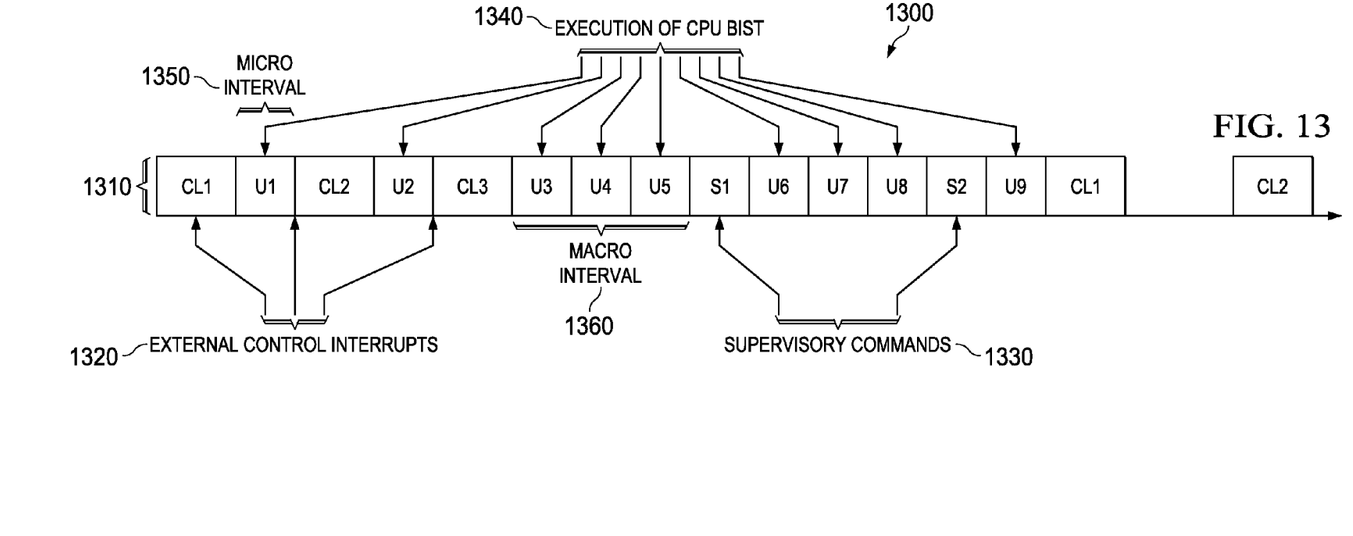
FIG. 13 is a timing diagram illustrating interspersed test operations for interruptible non-destructive run-time built-in self-test in accordance with embodiments of the disclosure.

FIG. 13 is a timing diagram illustrating interspersed test operations for interruptible non-destructive run-time built-in self-test in accordance with embodiments of the disclosure. For example, timeline 1310 includes timeslots for external control interrupts 1320 (such as for managing feedback-based command loop systems), timeslots for supervisory commands 1330 (such as for managing external processes or modules in a control system), and timeslots for execution of CPU BIST 1340 are interspersed between the timeslots for external control interrupts 1320 and the timeslots for supervisory commands 1330. Test application operations are interspersed using micro-intervals 1350 (discussed above) and macro-intervals 1360 (also discussed above). As illustrated in FIG. 13, not every idle timeslot needs to be utilized for test application operations.

When IRT-BIST is programmed for introduction into an application environment, the length and amount of operational tests are carefully selected so as to ensure that execution of the test applications does not cause an imbalance in the execution of the external control loops. Timeline 1310 illustrate how IRT-BIST test applications can fit into an application environment during idle times without impacting the system performance. For example, in test slots U1 and U2 (when the core receives an external interrupt from sensors), the currently running IRT-BIST application is exited at the end of micro-interval to service the interrupts. Also, when no interrupts occur during an IRT-BIST test application, the IRT-BIST test application continues until execution of one macro-interval is complete (e.g., test slots U3, U4, and U5). The IRT-BIST test application then exits to service the supervisory command loops. (In the illustrated example, one macro-interval is selected to be equal to three micro-intervals).

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A system for self-test comprising:
   a processor that is arranged to execute a normal application for controlling a process that is external to the processor, wherein the normal execution is executed in normal execution timeslots that have idle timeslots that are interspersed in time between the normal execution timeslots; and a built-in self-test (BIST) controller that is arranged to detect the presence of an idle timeslot, to use a scan chain to scan-in a first test pattern for a test application, to cause the first test pattern to be executed by the processor during the detected idle timeslot, to scan-out a first result pattern generated by the execution of the first test pattern, and to determine the presence of an error by evaluating the first result pattern;

wherein the BIST controller is arranged to log an interrupt that occurs during execution of the first test pattern and to assert the logged interrupt after completion of the execution of the first test pattern and wherein the BIST controller is arranged to assert a non-maskable interrupt upon detection of the non-maskable interrupt during the execution of the first test pattern, and to restart the execution of the first test pattern when a subsequent idle timeslot is detected.

2. A method for monitoring the execution of a processor, comprising:

executing a normal application for controlling a process that is external to the processor, wherein the normal execution is executed in normal execution timeslots that have idle timeslots that are interspersed in time between the normal execution timeslots;

detecting the presence of an idle timeslot;

scanning-in a first test pattern for a test application; causing the first test pattern to be executed by the processor during the detected idle timeslot;

scanning-out a first result pattern generated by the execution of the first test pattern; and determining the presence of an error by evaluating the first result pattern;

detecting an interrupt that is generated externally to the processor during the execution of the first test pattern, asserting the interrupt to the processor after conclusion of the execution of the first test pattern when the detected interrupt is a maskable interrupt, and asserting the interrupt to the processor before the conclusion of the execution of the first test pattern when the detected interrupt is a non-maskable interrupt.

* * * * *